United States Patent
Chen et al.

(10) Patent No.: US 11,237,925 B2
(45) Date of Patent: Feb. 1, 2022

(54) SYSTEMS AND METHODS FOR IMPLEMENTING PERSISTENT DATA STRUCTURES ON AN ASYMMETRIC NON-VOLATILE MEMORY ARCHITECTURE

(71) Applicant: Tsinghua University, Beijing (CN)

(72) Inventors: Kang Chen, Beijing (CN); Yongwei Wu, Beijing (CN); Teng Ma, Beijing (CN); Mingxing Zhang, Beijing (CN)

(73) Assignee: Tsinghua University, Beijing (CN)

( * ) Notice: Subject to any disclaimer, the term of this patent is extended or adjusted under 35 U.S.C. 154(b) by 120 days.

(21) Appl. No.: 16/903,760

(22) Filed: Jun. 17, 2020

(65) Prior Publication Data
US 2021/0397524 A1    Dec. 23, 2021

(51) Int. Cl.
| | |
|---|---|
| *G06F 11/14* | (2006.01) |
| *G06F 16/23* | (2019.01) |
| *G06F 16/27* | (2019.01) |
| *G06F 11/20* | (2006.01) |

(52) U.S. Cl.
CPC ...... *G06F 11/1471* (2013.01); *G06F 11/1464* (2013.01); *G06F 11/1474* (2013.01); *G06F 11/2064* (2013.01); *G06F 16/2365* (2019.01); *G06F 16/27* (2019.01); *G06F 2201/82* (2013.01)

(58) Field of Classification Search
None
See application file for complete search history.

(56) References Cited

U.S. PATENT DOCUMENTS

| | | | |
|---|---|---|---|
| 8,069,366 B1 * | 11/2011 | Wenzel | H04L 69/18 714/6.3 |
| 8,386,425 B1 * | 2/2013 | Kadayam | G06F 11/2064 707/613 |
| 2021/0081396 A1 * | 3/2021 | Tian | H04L 63/12 |

* cited by examiner

*Primary Examiner* — Aleksandr Kerzhner
*Assistant Examiner* — Eddy Cheung
(74) *Attorney, Agent, or Firm* — IPro, PLLC; Xiaomin Huang (57) ABSTRACT

Systems and methods are provided for persisting a data structure. One method may comprise, at a front-end node in a computing system: generating a data structure operation record for a data structure operation directed to a data structure persisted in a non-volatile memory (NVM) in a back-end node of the computing system, appending the data structure operation record in an operation log, generating a transaction record for a transaction that includes a plurality of memory operations that collectively accomplishing the data structure operation, appending the transaction record in a transaction log, flushing the transaction log to the back-end node after flushing the operation log; and at the back-end node of the computing system: persisting received operation log and received transaction log in the NVM, and accomplishing the data structure operation by performing the plurality of the memory operation records with the data structure operation record as a commit signal.

20 Claims, 5 Drawing Sheets

SYSTEMS AND METHODS FOR IMPLEMENTING PERSISTENT DATA STRUCTURES ON AN ASYMMETRIC NON-VOLATILE MEMORY ARCHITECTURE

TECHNICAL FIELD

The disclosure herein relates to distributed computing, particularly relates to persisting data structures on an asymmetric non-volatile memory storage architecture.

BACKGROUND

Modern computing systems typically involve using one or more computer servers to serve many clients. Today, more and more computer servers are hosted by data centers, which have many computers and associated data storages. With the emergence of non-volatile memory (NVM) devices, conventional hard drives, disks or tapes used in data centers are being replaced with NVM based storages (e.g., NVM based Solid State Drives (SSDs)). Most existing computing systems have a symmetric architecture, in which one NVM based storage (e.g., SSD) is attached to one server machine so that CPU of the server machine may treat the NVM like part of the local memory and store and read the NVM using load and store instructions just like accessing local memory. In the symmetric architecture, the NVM and its data will be unavailable if the server machine goes down. Therefore, there is a need for an asymmetric architecture in which one or more NVM based storages may become a shared resource among servers and still be available to other servers even one or more server fails.

SUMMARY

Disclosed herein is a method, comprising, at a front-end node in a computing system, generating a data structure operation record for a data structure operation, appending the data structure operation record in an operation log, generating a transaction record for a transaction, appending the transaction record in a transaction log, flushing the operation log to a back-end node of the computing system, and flushing the transaction log to the back-end node after flushing the operation log. The data structure operation may be directed to a data structure persisted in a non-volatile memory (NVM) in the back-end node and the data structure operation record may include an operation type and parameter(s) for the data structure operation. The transaction may include a plurality of memory operations that collectively accomplish the data structure operation on the data structure persisted in the NVM and the transaction record may include a plurality of memory operation records corresponding to the plurality of memory operations. The method may further comprise, at the back-end node of the computing system, persisting the operation log received from the front-end node in the NVM, persisting the transaction log received from the front-end node in the NVM and performing memory updates according to the plurality of the memory operation records to accomplish the data structure operation, with the data structure operation record in the operation log received by the back-end node serving as a commit signal for the transaction.

Disclosed herein is a computing system that may comprise a front-end node that comprises at least one central processing unit (CPU), a dynamic random-access memory (DRAM) and a first Remote Direct Memory Access (RDMA) enabled Network Interface Card (RNIC). The at least one CPU at the front-end node may be configured to: generate a data structure operation record for a data structure operation, append the data structure operation record in an operation log, generate a transaction record for a transaction, append the transaction record in a transaction log, flush the operation log to the back-end node via the first RNIC and flush the transaction log to the back-end node via the first RNIC after flushing the operation log. The data structure operation may be directed to a data structure persisted in the NVM and at least partially cached in the DRAM. The data structure operation record may include an operation type and parameter(s) for the data structure operation. The transaction may include a plurality of memory operations that collectively accomplishing the data structure operation on the data structure persisted in the NVM, the transaction record including a plurality of memory operation records corresponding to the plurality of memory operations. The computing system may further comprise a back-end node that comprises a second RNIC and a non-volatile memory (NVM). The second RNIC at the back-end node may be configured to: persist the operation log received from the front-end node in the NVM, persist the transaction log received from the front-end node in the NVM and perform memory updates according to the plurality of the memory operation records to accomplish the data structure operation, with the data structure operation record in the operation log received by the back-end node serving as a commit signal for the transaction.

Disclosed herein is one or more computer-readable non-transitory media comprising one or more instructions that when executed by one or more processors is to configure the one or more processors to perform operations comprising: at a front-end node in a computing system: generating a data structure operation record for a data structure operation, the data structure operation being directed to a data structure persisted in a non-volatile memory (NVM) in a back-end node of the computing system, the data structure operation record including an operation type and parameter(s) for the data structure operation; appending the data structure operation record in an operation log; generating a transaction record for a transaction, the transaction including a plurality of memory operations that collectively accomplishing the data structure operation on the data structure persisted in the NVM, the transaction record including a plurality of memory operation records corresponding to the plurality of memory operations; appending the transaction record in a transaction log; flushing the operation log to the back-end node; and flushing the transaction log to the back-end node after flushing the operation log; and at the back-end node of the computing system: persisting the operation log received from the front-end node in the NVM; persisting the transaction log received from the front-end node in the NVM; and performing memory updates according to the plurality of the memory operation records to accomplish the data structure operation, with the data structure operation record in the operation log received by the back-end node serving as a commit signal for the transaction.

DETAILED DESCRIPTION

Specific embodiments according to the present disclosure will now be described in detail with reference to the accompanying figures. Like elements in the various figures are denoted by like reference numerals for consistency.

Figure 1:
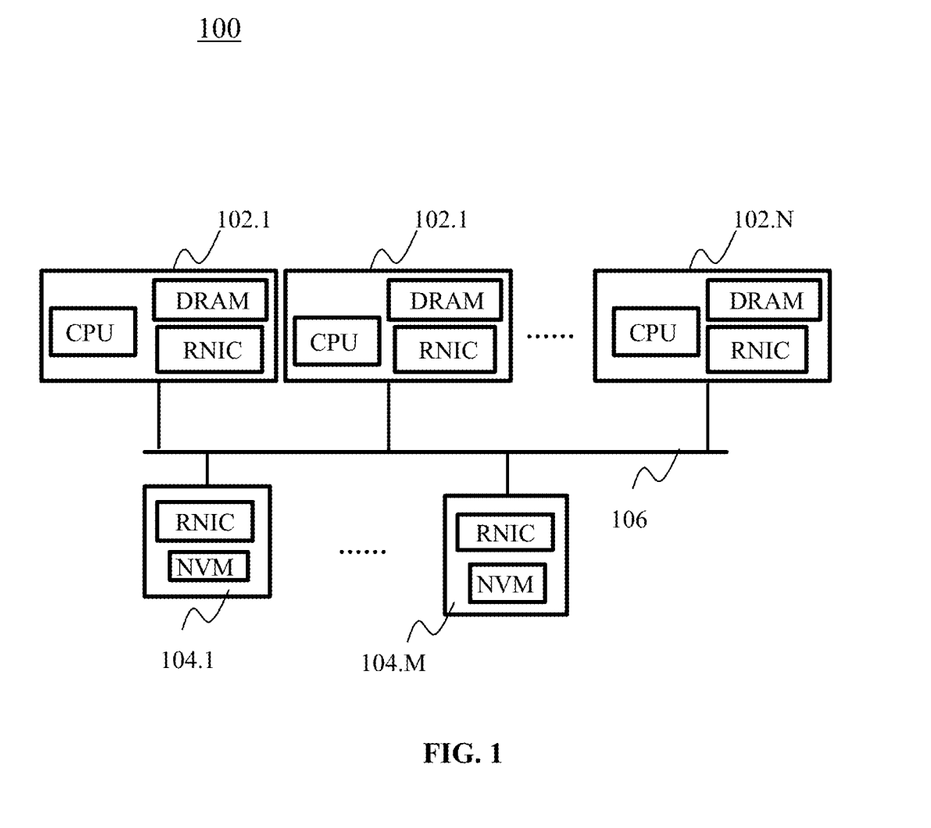
FIG. 1 schematically shows a computing system in accordance with an embodiment of the present disclosure.

The present disclosure provides systems and methods for persisting data in an asymmetric non-volatile memory (NVM) architecture. FIG. 1 schematically shows a computing system 100 according to an embodiment. The computing system 100 may comprise a plurality of front-end nodes 102.1 through 102.N, a fast network 106 and one or more back-end nodes 104.1 through 104.M. Each of the plurality of front-end nodes 102.1 through 102.N may be a computer machine (e.g., a blade in a server farm) that may comprise one or more central processing units (CPUs), a dynamic random-access memory (DRAM) and a Remote Direct Memory Access (RDMA) enabled network interface card (RNIC).

Each of the one or more back-end nodes 104.1 through 104.M may be a storage device that uses non-volatile memory (NVM) as its storage medium, and may be referred to as a NVM device or NVM based device or simply NVM. Each of the one or more back-end nodes 104.1 through 104.M may comprise a RNIC and one or more NVM storage units. In some embodiments, each of the one or more back-end nodes 104.1 through 104.M may also comprise a CPU, a graphical processing unit (GPU), an Application Specific Integrated Circuit (ASIC), or any combination of these processing units. In at least one embodiment, the back-end nodes 104.1 through 104.M may be deployed in RDMA-based rack-scale data-centers and provide one-sided communication that avoid using CPU resource in the back-end (e.g., remote procedure calls that are initiated by the front-end nodes and can be fulfilled without involvement of the CPU resource in the back-end node) when servicing front-end nodes. The fast network 106 may be a low latency network, such as but not limited to, an InfiniBand.

In some embodiments, the number of NVM devices may be much smaller than the number of computer machines. That is, the number M may be much smaller than the number N. In at least one embodiment, NVM devices may be attached to only a few specialized "blades". Thus, one or more NVM device/blade may be shared by multiple server machines. In addition, in some embodiments, the memory space of these server machines may be much smaller than the storage capacity of the NVM devices. That is, the storage capacity of each of the back-end nodes 104.1 through 104.M may be much larger than each of the DRAMs of the front-end nodes 102.1 through 102.N.

In at least one embodiment, in a back-end node (e.g., back-end node 104.1), the NVM may be attached to the memory bus of the back-end node, which may be coupled to the RNIC of the back-end node, and the front-end ends 102.1 through 102.N may operate data structures persisted in NVM directly via the RNIC of the back-end node. The relationship between front-end and back-end may be "many-to-many" (a front-end node can access multiple back-end nodes and a back-end node may be shared by multiple front-end nodes).

Compared to a symmetric architecture, an asymmetric NVM architecture may offer several advantages: a) it enjoys the benefits of disaggregation; b) it naturally matches the desire of sharing NVM devices; c) it can ensure availability with multiple back-end nodes; and d) potentially simpler back-end nodes may lead to better reliability. Disaggregation may refer to resource being decoupled from a specific server machine and shared among multiple server machines in a sharing pool. For example, a printer or a storage device may be decoupled from one computer machine and becomes shared resource on a network for all computers in the network. It provides an efficient way to deploy hardware as well as bring down the cost. Moreover, multiple back-end nodes may provide back up for each other to ensure better availability. Furthermore, unlike the Network Attached Storage, which relies on file system service in the storage node and is based on the "block access interface" (which leads to a fundamental problem of read/write amplification when requiring fine-grained access), because the NVM is byte-addressable, an asymmetric NVM architecture may provide fine-grained and variable-size byte-addressable access with higher Input/Output operation per second (IOPS) and flexibility.

In an embodiment, all persistent data may be stored in the NVM devices of the one or more remote back-end nodes 104.1 through 104.M and may be much larger than DRAM in any one of the plurality of the front-end nodes 102.1 through 102.N. That is, DRAM of any front-end node may have a limited size compared to the storage size of the NVM device in a back-end node. Moreover, the back-end nodes may be passive. That is, in general, the back-end nodes 104.1 through 104.M do not actively start a communication with a front-end node, but only passively respond to the application programming interface (API) invocations from the front-end. In some embodiments, the RNIC of the back-end nodes 104.1 through 104.M may support RDMA. In other words, the front-end nodes 102.1 through 102.N may directly access data in the back-end nodes 104.1 through 104.M via RDMA based read and write operations (e.g., RDMA_Read and RDMA_Write) operations supported by the RNIC.

In one embodiment, the computing system 100 may use one-sided RDMA to achieve better performance. For example, a front-end node may use polling to detect completions because polling is more efficient than interrupts. The NVM devices at the back-end nodes may provide their storage space by exposing the NVM as respective memory spaces. Therefore, the front-end nodes 102.1 through 102.N may access the memory space on remote NVM devices of the back-end nodes 104.1 through 104.M directly via RDMA_Write, RDMA_Read, and RDMA atomic operations without notifying the processing unit on the respective back-end nodes.

In at least one embodiment, however, each of the back-end nodes 104.1 through 104.M may need to manage its metadata consistently. RDMA may provide several atomic verbs to guarantee that any update to a unit of data (e.g., 64 bits) is atomic. Thus, RDMA atomic operations may be applied to critical metadata, e.g., root pointer of a data structure. Due to the non-volatile nature of the remote NVM, data may be corrupted if a back-end crashes during a single RDMA_Write operation. One embodiment may guarantee data integrity via checksum.

In an embodiment, the computing system 100 may implement two sets of simple and fixed API functions in the back-end node based on RDMA verbs. The first set of APIs may provide a transactional interface that allows the front-end nodes 102.1 through 102.N to push a list of update logs to the back-end nodes 104.1 through 104.M for persistency. The list of update logs may be grouped based on transactions and all updates in one transaction may be guaranteed to be executed in an all-or-nothing manner. The transactional interface may have two variants. In an embodiment, a transaction may be accomplished by: 1) a collection of memory operations; or 2) a data structure operation (e.g., delete an entry in a tree, add an element in a list). Each of the memory operation may include a memory address (e.g., in the memory space of an NVM) and value pair. The data structure operation may include an operation to be performed to a certain data structure and parameters for the operation. In some embodiments, the data structure operation may be used to reduce any stall that may be caused by remote persistency. The back-end nodes may ensure that all memory addresses in one transaction are updated atomically on the corresponding NVM.

The second set of APIs may handle memory management, which may include remote memory allocation, releasing, and global naming. In one embodiment, a computing system 100 may implement a two-tier slab-based memory allocator. Each of the one or more back-end nodes 104.1 through 104.M may ensure persistency and provide the fixed-size blocks. The front-end 102.1 through 102.N may deal with the finer-grained memory allocations. In an embodiment, to facilitate recovery, several specific metadata may be stored in the back-end global naming space.

In one embodiment, the computing system 100 may support SWMR (Single Writer Multiple Reader) access model by concurrent control mechanisms. That is, one front-end node may be a designated writer that may perform write operations and other front-end nodes may be readers. In some embodiments, there may be multiple front-end writer nodes and multiple front-end reader nodes with locks to maintain data consistency. In yet some other embodiments, a front-end node may read or write as necessary and there also may be locks to maintain data consistency. If two front-end nodes perform writes on the same address in one back-end node, they should be synchronized by locks. In addition, the framework assumes that reads and writes to the same address may also be properly synchronized by locks. One embodiment may support both lock-free and lock-based data structures. Existing RDMA primitives may be used to implement synchronization. Moreover, to support recovery and replication, an embodiment of the computing system 100 may adopt a consensus-based voting system to detect machine failures.

In some embodiments, the NVM management APIs may be implemented at each of the back-end nodes 104.1 through 104.M because using only one-sided RDMA operations is inefficient. In addition, because they provide the basic functions needed by all applications, it is convenient to support them directly in the back-end nodes to reduce network communication (one round for RPC invocation). In some embodiments, two memory management APIs may be provided: remote_nvm_malloc and remote_nvm_free. The front-end node may use them to allocate and release back-end NVM memory, respectively. Moreover, a persistent bitmap may be to record the usage of NVM and persisted as part of metadata, for example, with one bit indicating the allocation status of each block of an NVM.

Because front-end nodes may access the back-end nodes via one-sided RDMA, remote fetching based Remote Procedure Call (RPC) may be used to implement the interfaces. In one embodiment, each of the back-end nodes 104.1 through 104.M may provide two buffers for a front-end allocator to write the requests and fetch back the responses. The front-end nodes may put requests via RDMA_Write to one buffer and get responses via RDMA_Read from another buffer in each back-end node, while the back-end nodes may be passive and do not need to deal with any network operation.

Figure 2A:
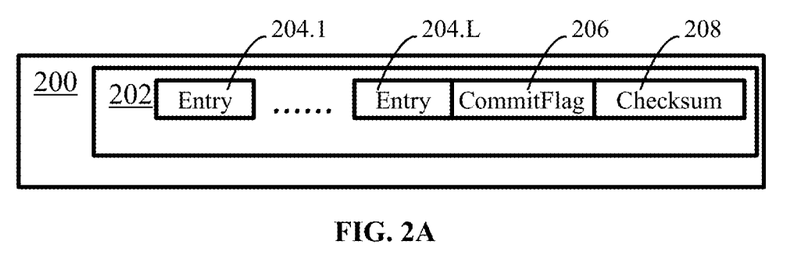
FIG. 2A schematically shows a transaction log in accordance with an embodiment of the present disclosure.

FIG. 2A schematically shows a transaction log 200 in accordance with an embodiment of the present disclosure. In some embodiments, each time a front-end node (e.g., 102.1) makes an update (e.g., insert a new element, delete an existing element, or modify the value of an existing element) on a data structure persisted on a back-end node (e.g., 104.1), a transaction may be generated at the front-end node. The transaction may be accomplished by a plurality of memory operations. The transaction log 200 may be an embodiment of a redo log to reduce persistency overhead and decouple update of the data structure in NVM and the persistency of redo log. The transaction log 200 may comprise one or more transaction records 202 with each transaction record 202 corresponding to one transaction. Each transaction record 202 may be appended to the transaction log 200 after the transaction record 202 is generated. In various embodiments, each transaction may be carried out on an all-or-nothing manner.

In an embodiment, each of the back-end nodes 104.1 through 104.M may keep a data area to hold one or more data structures and a log area to record the transactions. The front-end may directly read the data area, but any updates have to go through the log area. It should be noted that the transaction log 200 may be stored in the memory (e.g., DRAM) or a buffer of the front-end node in which it is generated before it is flushed to a back-end node.

In an embodiment, at a low level, the data structure persisted in the NVM may support read and write operations. Moreover, the NVM may be byte-addressable, and thus access to NVM may be fine-grained and variable-sized with a smallest piece of data to be written or read to be just one byte. A read may return data that is not yet persisted, because if there is a persistent fence the read should return the requested data as long as the requested data is produced before the fence. Fence as used herein may refer to a virtual "fence" that may isolate a node and ensure no I/O may be done from it. Fencing is typically done automatically, for example, by cluster infrastructure such as shared disk file systems, in order to protect processes from other active nodes modifying the resources during node failures.

In general, when a write (update) returns, the data should be persisted in the back-end NVM. The straightforward implementation of the two operations is to perform RDMA_read or RDMA_write on the back-ends. However, this implementation may incur considerable rounds of network communications, which is much slower than memory accesses. In comparison, in various embodiments, by using a transaction log, a write may return after a transaction record (e.g., transaction record 202) is persisted and does not need to wait for actual data structure modification to be completed.

In an embodiment, one transaction may comprise a plurality of memory operations. Each memory operation may be represented by a memory operation record entry in a transaction record 202. As shown in FIG. 2A, the transaction record 202 may comprise a plurality of memory operation record entries 204.1 through 204.T, a commit flag 206, and a checksum 208. Each of the plurality of memory operation record entries 204.1 through 204.T may contain one memory operation record, with T being a positive integer larger than one. In a non-limiting example, the commit flag 206 may be one byte and the checksum 208 may be four bytes. In some embodiments, the checksum 208 of the transaction record 202 may be recorded as an end mark and used to validate the integrity of the transaction log 200 after the latest transactions have been appended. During a recovery process, after the restart of a back-end node, the restarted back-end node may use the checksum of the last transaction to validate the consistency of committed data.

In one embodiment, the transaction API may be implemented in a remote procedure call: remote_tx_write, with a list of {address, value} pairs as the input parameter. The address in each of the {address, value} pair may be a memory address to be operated on and the value of corresponding {address, value} pair may be a value that should be written to this memory address. To implement remote_tx_write, the framework library may construct a continuous set of memory operation records and append these memory operation records to the corresponding log area in remote NVM via a single RDMA_Write operation.

Figure 2B:
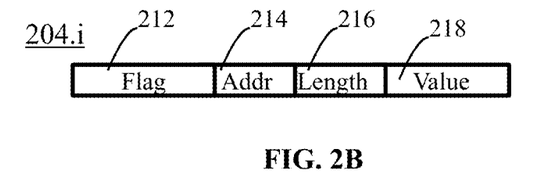
FIG. 2B schematically shows a memory operation record in accordance with an embodiment of the present disclosure.

FIG. 2B schematically shows a memory operation record entry 204.*i* in accordance with an embodiment of the present disclosure. The memory operation record entry 204.*i* may be simply referred to as a memory operation record. The lower-case letter "i" may indicate that this memory operation record entry may be any one of the memory operation record entries (e.g., one through T) in a transaction. The memory operation record in the memory operation record entry 204.*i* may comprise a flag field 212, an address field 214, a length field 216 and a value field 218. The flag field 212, which may be one byte in a non-limiting example, may comprise a flag used for optimization related to batching. The address field 214, which may be eight bytes in a non-limiting example, may contain the address of the NVM to be written to. The length field 216, which may be four bytes in a non-limiting example, may contain the length of data (in bytes) to be written to the back-end node in a write operation. The value field 218 may be the number of bytes of data with the number being specified in the length field 216.

The transactional API may reduce the persistency latency due to modification of actual data structure and reduce the required rounds of RDMA operations. Without the transaction API, multiple rounds of RDMA operations are needed when writing to multiple noncontinuous areas of the NVM, or a continuous area with the size larger than a cache line.

This implementation of the transactional API is fixed and simple, improving the reliability. In some embodiments, each write (update) may be wrapped in a transaction and may generate a number of memory operation records for the transaction, and the back-end node provides the transaction APIs to ensure that the memory operation records for one transaction are persisted atomically in an all-or-nothing manner. When the memory operation records in one transaction is persisted, the back-end node sends back an acknowledgement, so that the write in the front-end may return and is guaranteed to be durable. The back-end node also guarantees that the modifications to the actual data structure are performed (i.e., replaying the persisted log entries) in an order that follows the sequential log writing.

Figure 3:
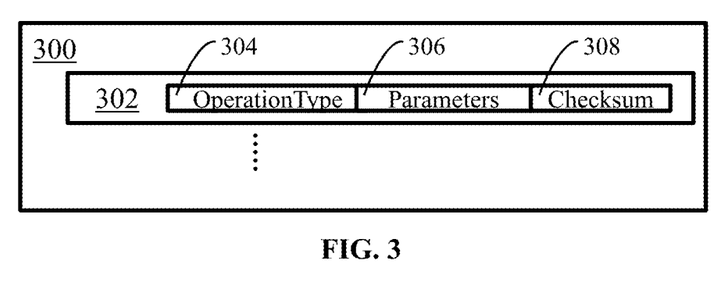
FIG. 3 schematically shows an operation log with one entry for an operation in accordance with an embodiment of the present disclosure.

To further reduce latency of data persistency, the computing system 100 may also implement an operation log. FIG. 3 schematically shows an operation log 300 with one data structure operation record 302 for an operation in accordance with an embodiment of the present disclosure. The operation log 300 may refer to a log that may hold one or more data structure operation records. In some embodiments, each transaction may correspond to one data structure operation, and thus, one transaction record 202 may have a corresponding data structure operation record 302. In contrast to the transaction log 200, in which one transaction record 202 may comprise multiple memory operation record entries, each write may incur one data structure operation record 302 to be generated and appended in the operation log 300. The data structure operation record 302 may be a record for a data structure operation to be performed in a persistent data structure and contain the instruction for carrying out the data structure operation (e.g., insert, delete or update an entry in a stack, queue, list, tree-like data structure).

Although the operation log 300 in FIG. 3 is shown to contain one entry. In an embodiment, the operation log 300 may comprise more than one entry while entries are being generated and appended and pushed to a back-end node (e.g., one of the back-end nodes 104.1 through 104.M). The data structure operation record 302 may be used as an example to illustrate the details of one data structure operation, which may comprise an operation type field 304 (e.g., insert, delete, update), a parameters field 306 and a checksum field 308. A write may return after the operation log 300 is persisted in a back-end node. That is, a write may return when any newly appended data structure records may be persisted in the back-end node. In one embodiment, persisting the operation log 300 may be achieved by a single RDMA_write to a back-end node. It should be noted that the operation log 300 may be cached or stored in the memory (e.g., DRAM) or a buffer of the front-end node in which it is generated before it is flushed to a back-end node.

In an embodiment, the operation log 300 may enable batching and caching. Once the operation log entries are persisted, actual modifications on the data structure may be postponed and batched to improve performance while ensuring crash consistency. In an embodiment, asynchronous execution may remove network latency from the critical path and combining multiple writes may reduce write operations. Even after a crash, the proper state may be restored by replaying the operation log entries for any data structure operations that have not been completed (e.g., re-execute data structure operations to complete data modifications that have not been performed on the data structure in the persisted in NVM).

The memory operation records may help provide the "postpone" aspect. In an embodiment, the transaction log (e.g., memory operation records) may be flushed at a later time compared to the operation log and actual data structure modification may be delayed as long as the memory operation records are persisted. The operation log may help batching of the memory operations because memory operation records originally to be flushed in multiple writes may be combined into one remote_tx_write method call with the help of the operation log. At lower level, the operation log may reduce the number of RDMA_Write operations. With memory operation records only, each write may need at least two RDMA_Write operations: one for commit and the other for at least one memory operation. A write operation typically needs more than one memory operation, thus the number of RDMA_Write operations is usually larger than two. With the operation log, each write still needs one RDMA_Write, but no RDMA_Write for commit is required, because a corresponding operation record in the operation log may serve as a commit signal for a corresponding transaction. The number of RDMA_Write operations for the memory operation records may reduce because multiple writes may be coalesced into one RDMA_Write, depending on the addresses. In one embodiment, the commit for the batched memory operations (not for each write) also needs a RDMA_Write.

Figure 4:
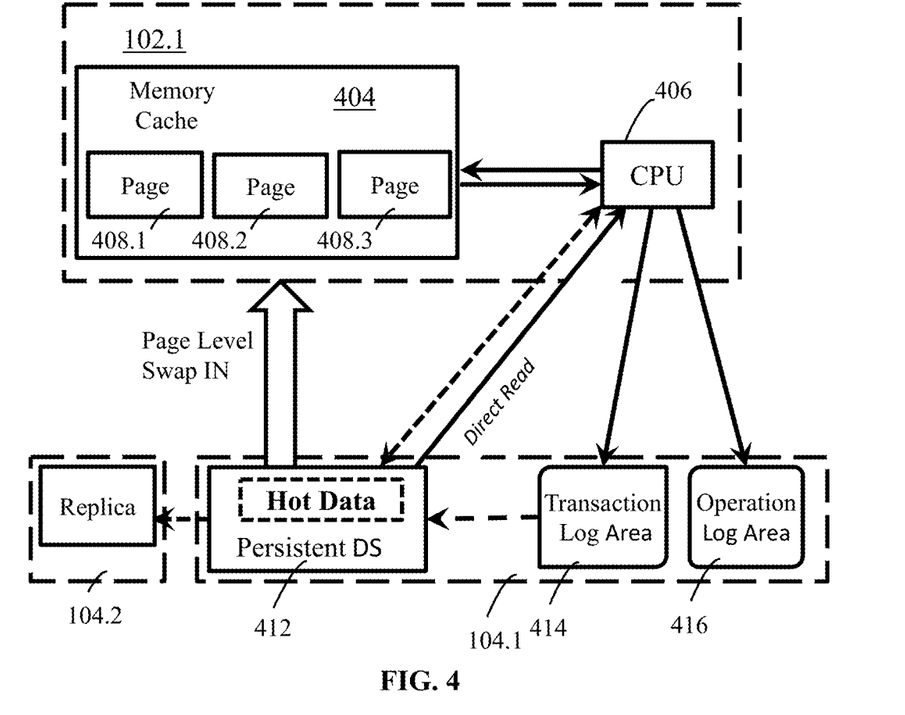
FIG. 4 schematically shows accessing and persisting data in a computing system in accordance with an embodiment of the present disclosure.

FIG. 4 schematically shows accessing and persisting data in the computing system 100 in accordance with an embodiment of the present disclosure. As shown in FIG. 4, the front-end node 102.1 may comprise a central processing unit (CPU) 406 that is configured to use data (e.g., read and write) and a DRAM 404 that may store a memory cache of data. The DRAM 404 may include a plurality of cache pages 408.1, 408.2 and 408.3. In one embodiment, there may be more or less cache pages, the three cache pages are shown as an example to illustrate how the system works. The back-end node 104.1 may comprise a transaction log area 414, an operation log area 416 and a data area 418. The transaction log area 414 may store the transactions flushed (e.g., pushed) from the front-end node 102.1 by the CPU 406. The operation log area 416 may store the operation log entries flushed (e.g., pushed) from the front-end node 102.1 by the CPU 406. The data area 418 may store the data structure that need to be persisted in the NVM, which may be referred to as the persistent Data Structure (DS). The back-end node 104.2 may be a mirror for the back-end node 104.1 and may contain a replica of what's on the back-end node 104.1 (e.g., the transaction log area, operation log area and data area). In one embodiment, some data in the persistent DS may be accessed frequently than other data, for example, the root of a B-plus (B+) Tree DS may be accessed more frequently than the leaves of a B+ Tree DS. The more frequently accessed data may be referred to as hot data and less frequently accessed data may be referred to as cold data.

Embodiments may divide each data operation into two parts: gathering data and applying the modifications in a Gather-Apply approach. In general, in the data gathering phase, when the CPU 406 needs data, it may first try to get the data from the memory cache. If the needed data is in the memory cache of the DRAM 404, there may be a cache hit and the data is read from the memory cache (e.g. one or more of the memory pages may be read into the CPU 406). If the needed data is not in the memory cache, there may be a cache miss and there may be two ways to serve the needed data from the back-end node 104.1. In the first approach referred to as a direct read the CPU 406 may read the needed data from the back-end node 104.1 directly (e.g., via a remote_nvm_read API call). In the second approach referred to as a swap-in, the needed data may be swapped into the memory cache of DRAM 404 and then served to the CPU 406 from the memory cache. In various embodiments, selection of one of the two approaches may depend on specific data structures being persisted (e.g., stack, queue, list, tree-like structures). In at least one embodiment, a principle may be followed in which swap-in may be used for hot data and direct read may be used for cold data. Because hot data may be needed more frequently, and thus, swap-in to the memory cache may reduce the access latency for all future access to the same hot data. While cold data may be less frequently accessed, it may not be needed again and therefore there is no need to cache it.

In one embodiment, the front-end node 102.1 may implement a caching policy that is a combination of Least Recently Used (LRU) and Random Replacement (RR). LRU works well in choosing hot data, but its implementation is expensive. RR is easy to implement but does not provide any guarantee of preserving hot data. The combination of LRU and RR may be a hybrid approach, in which a random set of pages may be chosen first for replacement and then a least used page may be selected from the set to discard. In some embodiments, no page flush may be needed in one embodiment because the write workflow may already put the transaction records in the back-end node.

In the apply modification phase, the front-end node 102.1 may modify data and persist these changes to the back-end node 104.1 in the computing system 100. Each modification operation by the CPU 406 may cause one operation log entry to be flushed to the back-end node 104.1 for recovery. In an embodiment, one or more data structure operation records 302 may be persisted in the operation log area during a flush of the operation log. The operation type filed 304 may have a value indicating an operation to be performed on the data, and the parameters field 306 may contain parameters for the operation. The transaction log entries may also be generated, with each memory operation record containing a flag in the flag field 212, an address in the address field 214 and data in the value field 218. In an embodiment, the transaction log entries may be generated after the operation log entries and the transaction log entries may be cached in a buffer at the front-end node 102.1. That is, the memory operation records do not need to be flushed immediately. Moreover, in an embodiment, a memory operation record may contain a pointer to a previously flushed operation log entry for its data value instead of containing the data value itself. That is, the value field 218 may contain a pointer pointing to the actual data in a data structure operation record and the size of the operation record may be reduced. In an embodiment, the pointer may be an address pointing to the back-end memory (NVM). Because after the operation log entry is stored in the back-end node, the data structure modification has been persisted and is recoverable, the data value in the data structure operation record may be used for the memory operation. By reducing the size of the operation record, the size of the transaction log entry may be reduced for a data write operation. In such an embodiment, the flag in the flag field 212 may be used to indicate that such a pointer is used.

In an embodiment, while flushing the logs, the cached data if existed may also be modified accordingly in the memory cache of the DRAM 404. If a number of data structure operations get executed successfully, or the buffer at the front-end node 102.1 is full, the buffered transaction log entries, together with a commit signal (e.g., TX_COMMIT appended in a transaction) may be flushed to the back-end node (e.g., via remote_tx_write).

The operation logs in the operation log area 416 and transaction logs in the transaction log area 414 may be handled by the back-end node 104.1 and may be replicated to the mirror-node 104.2. It should be noted that using a mirror-node 104.2 and creating a replication on the mirror-node 104.2 may be optional. In the embodiments that have mirror-nodes, at least one mirror-node may be attached with a non-volatile device like SSD, Disk or even NVM. In some embodiments, the back-end nodes may replicate the transaction/operation logs to mirror-nodes before committing the transaction and acknowledging the front-end to avoid high overhead. If the mirror-node is equipped with NVM, the mirror-node may also implement a log replay function to apply transactions corresponding to transaction records in the transaction log to the replicated persistent data structure. Replicated logs in mirror-nodes may be read-only in an embodiment. To improve fault tolerance, in one embodiment, the mirror-node 104.2 may be deployed in a rack that is different from the rack of on which the back-end node 104.1 is deployed.

It should be noted that in some embodiments the mirror-node 104.2 is not equipped with NVM, for example, the mirror-node 104.2 may be equipped with a tape, a conventional hard drive, etc. In an embodiment, when the back-end node 104.1 crashes, if the mirror-node 104.2 is equipped with NVM, it may be voted as the new back-end. Otherwise, the front-end nodes may use the logs and data structures from the mirror-node 104.2 to recover the persistent data structure to a new back-end node. Moreover, in an embodiment, the back-end node 104.1 may be responsible for ensuring that the replica is persistent in its mirror-node 104.2. The front-end node 102.1 only needs to ensure that data is stored in the back-end node 104.1's NVM, but does not wait for an acknowledge after the replication from the back-end node 104.1 to the back-end node 104.2 completes. Thus, in at least one embodiment, the replication phase may be performed asynchronously.

In some embodiment, the persistent data structure may be a list data structure or another persistent data structure based on a list data structure, for example, stack and queue may also be implemented using the list data structure. There may be optimization directed to the list data structure. For example, because the only data items that can be accessed in a stack or queue are headers or tails and they are more frequently accessed than other elements in a stack or queue, a front-end node (e.g., the front-node 102.1) may only need to cache nodes pointed to by them to reduce the number of remote procedure calls (e.g., remote_nvm_read). In an embodiment, if there are not enough data items of headers and tails in the memory cache, (e.g., less than a threshold number), the front-end node may fetch corresponding data from the back-end node to the front-end node's memory cache.

Moreover, for a list data structure, due to the access pattern, multiple operations may be combined because the operations are only allowed on the stack header for a stack, and on the queue tail for a queue. Thus, in one embodiment, one or more pushes may be annulled by one or more pops for a stack, and one or more enqueues may be annulled by one or more dequeues for a queue. Annulled operations do not need to be executed on the back-end node's data and thus may be eliminated without even to be sent to the back-end node. Such an opportunity to combine multiple operations may be identified by checking the not-yet accomplished data structure operations in the operation logs in the front-end node's memory. For example, for a pop operation to a stack data structure, the number of not-yet accomplished push and pop operations in the operation log in the front-node's memory may be counted first. If the number of pushes is larger than the number of pops, there is no need to access the data area. That is, the front-end doesn't need to access the back-end NVM data via RDMA Read, because the data is available in the front-end cache. This optimization based on the operation log may reduce the RDMA operations significantly.

In some embodiment, the persistent data structure may be a tree-like data structure, which may be a tree data structure or a variation of a tree data structure (e.g., a B+ tree is a variant of a B-tree). One or more such embodiments may have optimization directed to tree-like data structures. For example, tree-like data structures may have a hierarchical organization, and the nodes in higher levels (root or near the root) may be more frequently accessed than lower level nodes (leaf or near leaf). Accordingly, in some embodiments, the higher-level nodes may be given a higher priority to be cached in the front-end node's memory (e.g., DRAM of node 102.1). In one embodiment, the front-end node may set a threshold N and the nodes with levels less than N will not be cached. Those not cached nodes of the data structure may be directly accessed through a remote fetching operation (e.g., via a RDMA_Read). In some embodiments, a threshold number L may be dynamically adjusted according to the cache miss ratio alpha ($\alpha$). i.e., if $\alpha$>50%, L=L−1 while if $\alpha$<25%, L=L+1. Otherwise, L stays unchanged. In comparison, the native LRU algorithm treats higher level nodes and lower level nodes the same, and hence incurs much more frequent cache misses. Therefore, in contrast to LRU, embodiments may give a "hint" to cache the hot nodes.

In addition, because trees are sorted data structures, the performance may be improved when the operations are sorted (e.g., by the key of a key-value pair). For example, for insertion of pairs (4, data 1), (2, data 2) and (6, data 3), after sorting insertions are in the order of (2, data 2), (4, data 1) and (6, data 3). In an embodiment, operations may be sorted and the sorted operations may be packed into a vector. The operation may start from the root of the tree down to the leaf nodes. The operations in a vector may be split according to the nodes to be accessed in each operation and may be executed in parallel. One example vector operation, vector_write, may be implemented for a binary search tree following the Gather-Apply paradigm. In the vector_write, based on the keys to be inserted, data may be read first to decide where to insert these nodes and then apply these inserts in the correct positions. Without batching, for example, two read rounds are needed if insert operation A and insert operation B both read the same node. In an embodiment, when operation A and operation B are carried out in one vector_write operation, only one round is needed to access this node. Similarly, if several operations modify the same NVM memory location, they may be compacted into one NVM write in a vector_write. The caching and batching optimization described for tree-like data structure may also be applied to skip-lists to reduce the number of RDMA operations.

Some embodiments may support a data structure even larger than the capacity of the NVM in a single back-end node by partitioning the persistent data structure and distributed partitions of the data structure across multiple back-end nodes. In one embodiment, the partitioning may adopt a key-hashing partitioning to improve the performance of various data structures. Each partition may have its own write lock and index data structure. While one front-end node is executing write operation in one of the partitions, multiple front-end nodes may still read from this partition and read or write to other partitions. Mapping tables between key range and partition may be stored in the global naming space for recovery. When one front-end node executes a data structure operation, it may first locate the appropriate back-end node with key-hashing and the operations on the identified back-end node may be similar to a single back-end node scenario.

In at least some embodiments, the back-end node 104.1 may also need to store metadata for recovery. In one embodiment, metadata may be stored in locations "well-known" to all front-end and back-end nodes, for example, the global naming space in the back-end NVM. Thus, after a restart by either a failed front-end node or a failed back-end node, the restarted node knows the location to find the needed information/data for recovery Then, the back-end node may map the virtual memory address to the previous NVM mapped regions. With this mechanism, a pointer to the back-end NVM is still valid after a failed front-end node restart.

In some embodiments, one or more of the following metadata may be stored in the global naming space. 1) The NVM area addresses, including the addresses for data and log areas. The area addresses may be needed for physical to virtual address translation for a corresponding front-end node. 2) The location of the persistent data structures (e.g., more than one data structure may be stored in one NVM and each may have a different location in the NVM) and auxiliary data. This may be achieved by storing the root references of data structures (e.g., the address of the root node for a tree). Additionally, other necessary data such as exclusive lock for concurrency control and mapping table between key range and partition may be stored next to the root reference. These metadata for different data structure instances may be persisted as a mapping table. 3) The allocation bitmaps (indicating allocation status). This information may be used to reconstruct the NVM usage lists and quickly recover the back-end allocator. 4) Addresses of log areas, Log Processing Numbers (LPNs) and Operation Processing Numbers (OPNs).

Log Processing Number (LPN) may be used to indicate the next memory operation record in the transaction log area that should be processed. In an embodiment, the LPN may be incremented by one each time a memory operation corresponding to a memory operation record in the transaction log area may be executed. There may be multiple LPNs on a back-end node with each LPN for a different data structure persisted in the NVM of the back-end node. Operation Processing Number (OPN) may be used to indicate the next data structure operation record in the operation log area that its corresponding transaction (e.g., the plurality of memory operations for accomplishing the data structure operation) has not been persisted to the data structure. In an embodiment, the OPN may be incremented by one each time a plurality of memory operations for one transaction (e.g., corresponding to one data structure operation) are all completed on the data structure. There may be multiple OPNs on a back-end node with each OPN for a different data structure persisted in the NVM of the back-end node. In one embodiment, the LPNs and OPNs may be generated and maintained at the back-end node.

The addresses of log areas, LPNs and OPNs may be used to find the transaction log, the operation log and location of the next log entries that need to be processed, and may be used to recover the data structure operations (e.g., from operations recorded in the operation log) and to reproduce memory operation records or transaction log entries (e.g., based on data structure operations recorded in the operation log and persisted on the back-end node, any transaction log entry that haven't been flushed to a back-end node when a writing front-end node crashes may be reproduced). In one embodiment, the footprint of metadata in the back-end NVM may be negligible (less than 0.2%).

Under the SWMR mode, write operations may be exclusive. Therefore, in one embodiment, while executing a write operation, the writer may need to acquire an exclusive lock first (e.g., via a procedure call WRITER_LOCK). The lock may be created after initializing the data structure (e.g., the metadata such as the root pointer created and stored in the global naming space), and its location is alongside the root reference for recovery. If the lock is created successfully, the LPN may be fetched (Log Processing Number) by the front-end node, and then the write operation may be executed. After finishing appending operation logs and transaction logs to the remote NVM based on LPN, this exclusive lock may be released. While the exclusive writes are being performed, other write operations (if any) will be blocked until the current writer has completed the current write operation. In one embodiment, to release the writer lock, the front-end node performing the write operation may reset via a WRITE_UNLOCK. To handle failures during the lock, in an embodiment, every write lock acquire operation and release operation may write a record (lock-ahead log) to the back-end node before appending the transaction log entries. Thus, if the front-end crashed before releasing the lock, the lock may be identified and released during recovery.

In some embodiments, there may be data structures support lock-free operations and these data structures may be referred to as lock-free data structures, for example, multi-version data structures and skip-lists. One exemplary lock-free multi-version data structure may be a lock-free tree-like data structure based on append-only-B-tree. Operations on this data structure may first make a copy of the corresponding data if needed. Then affected data may be modified or new data items may be inserted. For example, the writer may make a copy of all the affected nodes along the path to the root, a.k.a., path copying. Then, the nodes in the path may update some of the pointers pointing to the old data. Finally, new data may be inserted into the new path. After finishing all these operations, the root may be atomically changed to the new root by updating the root pointer. A vector operation described herein may help to reduce the number of network round trips significantly. Since the readers (e.g., front-end nodes performing read operation) can always get consistent data, this kind of concurrent control does not affect the performance of readers.

In a multi-version data structure, the only in-place update may be the root pointer. However, the pointer change may be performed atomically. Therefore, it doesn't need a recovery process. While recovering, the front-end may use the root pointer (which is well-known via naming mechanism) to find out the whole data structure.

Skip-list may be naturally lock-free and the only concern may be to carefully choose the order of operations. In an embodiment, the writer first may create the newly allocated node and set the successor pointers in this node accordingly. After that, the predecessor pointers may be updated from bottom to top. Readers may still get (potentially different) consistent views of skip-list in such a scenario, thus the lock is not required.

The use of lock-free data structures may need to ensure that memory is safely reclaimed, which may further complicate garbage collection. In one embodiment, this requirement may be achieved by a lazy garbage collection mechanism. After version changes, the front-end may release the old version's data. Back-end may delay this operation for n+l μs and then reclaims corresponding memory. It requires that latency of each pending data structure operation should be less than n μs to avoid memory leak (access the reclaimed memory). A smaller n may abort read operation more frequently, and a larger n may cause lower NVM utilization. In one embodiment, the ratio n/l may be fixed as 4000/1000 after pre-run the whole system.

For lock-based data structures, in some embodiments, RDMA atomic operations may be appropriate APIs to implement distributed sequencer and lock. In an embodiment, retry-based read locks may be implemented using a sequence number (SN), for example, an 8 bytes integer variable. Distinct from a writer lock, which may be invoked by a front-end node, retry-based read locks (e.g., Write_Begin and Write_End) may be executed by a back-end node. In one embodiment, when a back-end node applies memory operations of the persisted memory operation records to the actual data structure in NVM, it may atomically increase the SN twice, for example, before and after the modification.

A reader lock may be used to support a read operation that may be concurrent with a write operation to the same address. That is, a front-end node may try to read the same address another front-end node may be writing to. A front-end reader node may obtain a reader lock (e.g., via a Reader_Lock call) and release a reader lock (e.g., via a Reader_Unlock call) before and after a sequence of reads. In an embodiment, to disallow reads when data are being updated, the SN may be used. For example, SN being odd may indicate there is no write lock on data and it is safe to read data. If SN is even, a front-end reader node may need to wait until the current SN is odd. Odd SNs for no write lock is just an example, even SNs may also be used as an indicator. To ensure reads in between get the consistent view, the Reader_Unlock procedure may need to check that the SN is unchanged since the Reader_Lock call. If the SN is changed between the Reader_Lock and Reader_Unlock calls, a reader need to retry and fetch the data again.

Lock-free data structures may benefit the readers but create multiple copies by writers. Lock-based data structures may prioritize the writers without extra copies, but readers have to read multiple times until consistent data may be obtained. The right choice may depend on specific applications.

With the log mechanism, embodiments may ensure crash consistency with the non-volatile data and logs persisted in one or more back-end nodes. Similar to most distributed systems, a consensus-based voting system may be used to detect machine failures. In an embodiment, the monitor may be replicated to a plurality of back-end nodes (e.g., run on at least three nodes). Leases may be used to identify whether a back-end node is still alive. If a back-end node does not renew its lease when the lease expires, the node may be considered to have crashed. This mechanism may be implemented as a keepAlive service.

Assuming a crashed front-end will always reboot within a limited time, there may be a few crash scenarios need to be handled in some embodiments. Case 1: Front-end reader crash. If a front-end node crashes when performing a read, the front-node may reboot, and obtain any necessary metadata via the naming mechanism (e.g., from the global naming space) and resume execution after rebooting. If a front-end reader node cannot be rebooted, it may be replaced with another front-end node already in the computing system or a new machine, which may obtain any necessary metadata via the naming mechanism (e.g., from the global naming space).

Case 2: Front-end writer crash. If a front-end node crashes when performing a write, the back-end node may know this information through the keepAlive service. After the front-end node reboots, if there are any memory operations from the front-end node not replayed on the back-end node, the back-end node may validate whether all memory operation records of the last transaction record are flushed to the NVM (e.g., via the checksum 208 in the last transaction record received by the back-end node). If the transaction log in the back-end is consistent (e.g., contains all memory operation records of the last transaction record), the back-end node may let the rebooted front-end node resume as normal, same as a crashed reader, and the back-end node may perform any memory operations not yet performed in the NVM.

If the transaction log in the back-end is inconsistent, the back-end node may notify the rebooted front-end node and the rebooted front-end node may fetch the LPN, OPN and the operation log entry corresponding to the memory operation records that have not been replayed, and then re-execute the non-yet completed last transaction to regenerate the memory operation records of the last transaction record. It should be noted that, in general, where the transaction log is not consistent, there may be multiple operation log entries already persisted on the back-end node but their corresponding memory operation records have not been flushed to the back-end node yet. That is, there may be multiple transactions that haven't been committed in the data stored in the NVM of the back-end node. In this situation, the front-end node may proceed to regenerate transaction records for any not-yet completed transaction. In an embodiment, if a front-end writer node cannot be rebooted during a recovery process, a front-end reader node in the computing system or a new machine may be promoted to a front-end writer node by obtaining any necessary metadata via the naming mechanism (e.g., from the global naming space).

Case 3: Back-end transient failure. When a back-end node fails while executing RDMA_write/read, the front-end may detect it through the feedback from RNIC. Then the front-end may wait for the notification for the back-end node's recovery or a new voted backend. After rebooting, the back-end node may first reconstruct the mapping between physical addresses and virtual addresses. The mapping is stored in NVM and well-known via global addressing schema. After that, the back-end node may check whether the transaction log is consistent. If the transaction log is consistent, the back-end may start its normal execution immediately, e.g., perform memory operations that have not been applied, and then notify its liveness to the front-ends. If the transaction log is inconsistent, the back-end node may notify the corresponding front-end node, and that front-end node may flush the transaction log again to redo any transaction not yet persisted. If existing the operation log at the back-end node contain entries ahead of the transaction log at the back-end node, which means that one or more transaction records have not been flushed from front-end due to batching, the back-end node may notify the front-end node, and the front-end node may continue to execute its next operation.

Case 4: Back-end permanent failure. In this case, one of the mirror-nodes may be voted as the new back-end and provides service to the front-end. The new back-end will broadcast to living front-ends to announce such event. After that, the front-end may reconstruct the data structures to a new back-end by using the data and logs in the mirror-nodes. In an embodiment, if the back-end node fails in either case 3 or case 4, the front-end may handle any exceptions, abort the transaction and clear the cache.

Case 5: Mirror node crash. The consensus-based service may detect the failure of the mirror node and remove it out of the group.

In one embodiment, if both front-end and back-end nodes crash, the keepAlive service may coordinate front-end and back-end nodes, and lets the backend nodes to recover first. They will first check the status as in Case 2. Then, the front-end will determine how to recover according to the back-end's failure cases in Case 1.

Figure 5:
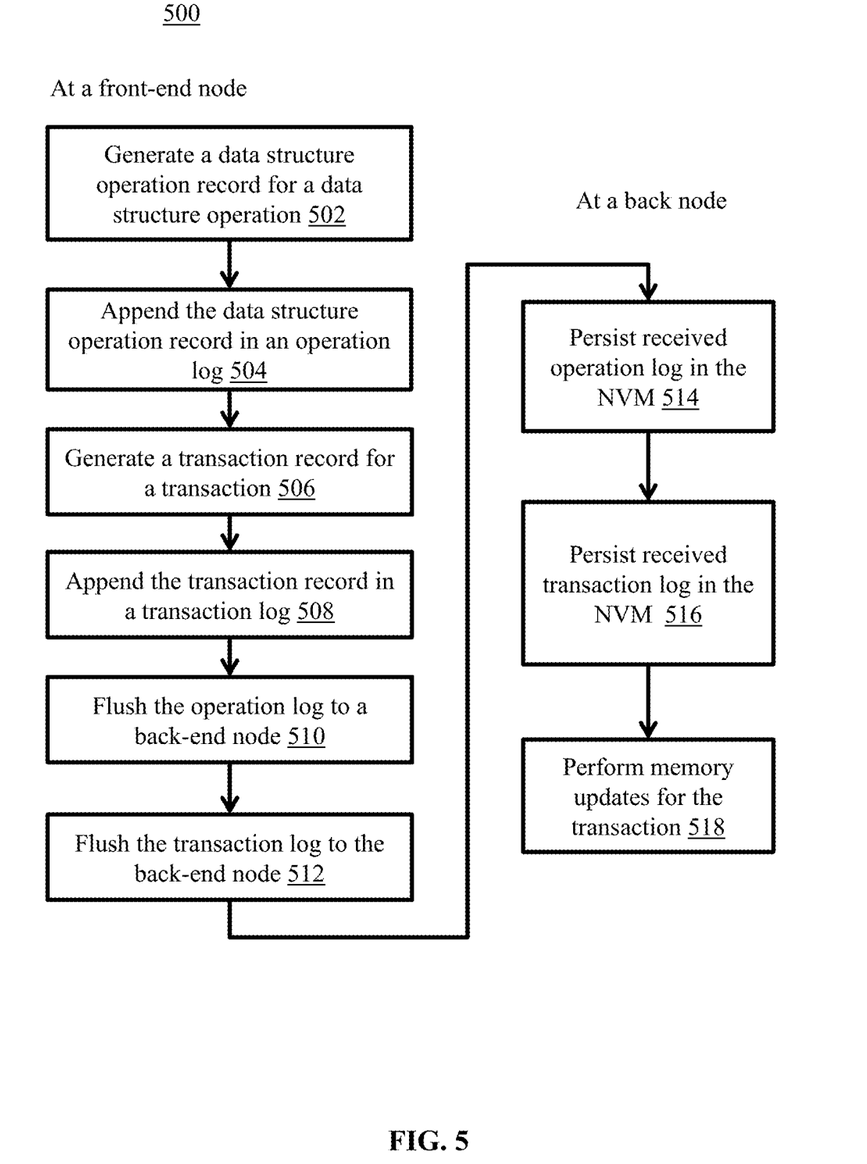
FIG. 5 shows a flow diagram for persisting a modification to a data structure in accordance with an embodiment of the present disclosure.

FIG. 5 shows a flow chart for a process 500 to persist a modification to a data structure in accordance with an embodiment of the present disclosure. The process 500 may start at a front-end node of a computing system at block 502. In block 502, a data structure operation record for a data structure operation may be generated. In one embodiment, a data structure may be persisted on a back-end node (e.g., back-end node 104.1) but data structure operations may be performed by a front-end node (e.g., front-end node 102.1). The front-end node may load a portion of the data structure and perform a data structure operation (e.g., by a CPU at the front-end node). The data structure operation may be directed to the data structure persisted in a non-volatile memory (NVM) in a back-end node of the computing system. The data structure operation record may be a record for the data structure operation and contain information for carrying out the data structure operation. For example, the data structure operation record may include an operation type and parameter(s) for the data structure operation.

In block 504, the data structure operation record may be appended in an operation log at the front-end node. In block 506, a transaction record for a transaction may be generated at the front-end node. In an embodiment, the data structure operation may be carried out in a transaction. The transaction may include a plurality of memory operations that collectively accomplish the data structure operation on the data structure persisted in the NVM. In an embodiment, the transaction record may include a plurality of memory operation records corresponding to the plurality of memory operations. In block 508, the transaction record may be appended in a transaction log at the front-end node. In block 510, the operation log may be flushed from the front-end node to the back-end node. In block 512, the transaction log may be flushed from the front-end node to the back-end node after flushing the operation log.

Then, the process 500 may continue to block 514 at the back-end node of the computing system. In block 514, the operation log received from the front-end node may be persisted in the NVM. In block 516, the transaction log received from the front-end node may be persisted in the NVM. In block 518, memory updates according to the plurality of the memory operation records may be performed to accomplish the data structure operation. In an embodiment, the data structure operation record in the operation log received by the back-end node may serve as a commit signal for the transaction.

Figure 6:
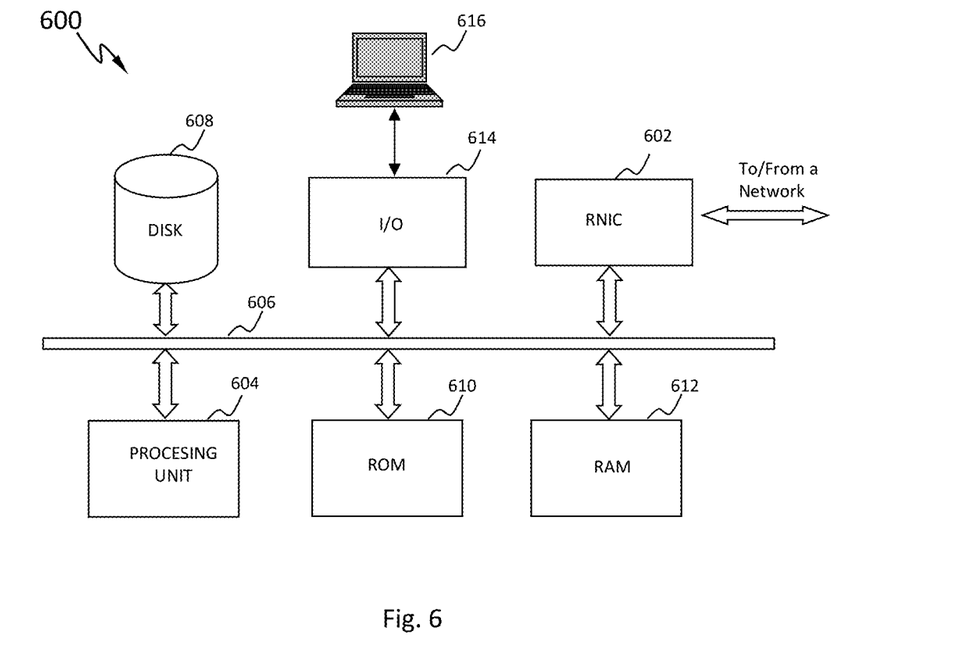
FIG. 6 shows a general computing device in accordance with an embodiment of the present disclosure.

FIG. 6 is a functional block diagram illustration for a computing device 600 on which the present teaching may be implemented. The computing device 600 may be a general-purpose computer or a special purpose computer or a blade in a rack of a data center, including but not limited to, a personal computer, a laptop, a server computer, a tablet, a smartphone, a storage node in a rack. The methods and operations as described herein may each be implemented on one or more embodiments of the computing device 600, via hardware, software program, firmware, or a combination thereof. In an embodiment, the computing device 600 may be used as a front-end node or a back-end node as described herein. Only one such computing device is shown for convenience, a computing system may include a plurality of front-end nodes, and one or more back-end nodes may be implemented in a shared resource pool for the plurality of front-end nodes.

The computing device 600, for example, may include one or more RNICs 602 connected to and from a network (e.g., an InfiniBand) connected thereto to facilitate data communications. The computing device 600 may also include a processing unit 604. In an embodiment for a front-end node, the processing unit 604 may include a central processing unit (CPU), for example, in the form of one or more processors (e.g., single core or multi-core), for executing program instructions. In an embodiment for a back-end node, the CPU may be optional for the processing unit 604, but it may comprise other processing units, for example, but not limited to, a Graphics Processing Unit (GPU), an ASIC, or one or more of both. It should be noted that the operations and processes described herein may be performed by a RNIC, CPU, a GPU, an ASIC, other circuitry or combination of the processing units and circuitry at the front-end node or the back-end node.

The exemplary computer device 600 may further include an internal communication bus 606, program storage and data storage of different forms, e.g., non-volatile storage 608 (e.g., conventional hard drive for a front-end node, or a NVM for a back-end node), read only memory (ROM) 610, or random access memory (RAM) 612, for various data files to be processed and/or communicated by the computer, as well as possibly program instructions to be executed by the CPU 604. The computing device 600 may also include an I/O component 614, supporting input/output flows between the computer and other components therein such as user interface elements 616 (which may be optional in a data center for a server machine as a front-end node or a storage system as a back-end node). The computing device 600 may also receive programming and data via network communications.

Hence, aspects of the system and method for persisting data in an asymmetric non-volatile memory (NVM) architecture, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the computer-implemented method.

All or portions of the computer-implemented method may at times be communicated through a network such as the Internet or various other telecommunication networks. Such communications, for example, may enable loading of the software from one computer or processor into another. Thus, another type of media that may bear the elements of the computer-implemented method includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the computer-implemented method. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-transitory storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing description and drawings represent embodiments of the present teaching, it will be understood that various additions, modifications, and substitutions may be made therein without departing from the spirit and scope of the principles of the present teaching as defined in the accompanying claims. One skilled in the art will appreciate that the present teaching may be used with many modifications of form, structure, arrangement, proportions, materials, elements, and components and otherwise, used in the practice of the disclosure, which are particularly adapted to specific environments and operative requirements without departing from the principles of the present teaching. For example, although the implementation of various components described above may be embodied in a hardware device, it can also be implemented as a firmware, firmware/software combination, firmware/hardware combination, or a hardware/firmware/software combination. The presently disclosed embodiments are therefore to be considered in all respects as illustrative and not restrictive, the scope of the present teaching being indicated by the following claims and their legal equivalents, and not limited to the foregoing description.

What is claimed is:

1. A method, comprising:
   at a front-end node in a computing system:
   generating a data structure operation record for a data structure operation, the data structure operation being directed to a data structure persisted in a non-volatile memory (NVM) in a back-end node of the computing system, the data structure operation record including an operation type and parameter(s) for the data structure operation;
   appending the data structure operation record in an operation log;
   generating a transaction record for a transaction, the transaction including a plurality of memory operations that collectively accomplishing the data structure operation on the data structure persisted in the NVM, the transaction record including a plurality of memory operation records corresponding to the plurality of memory operations;
   appending the transaction record in a transaction log;
   flushing the operation log to the back-end node; and
   flushing the transaction log to the back-end node after flushing the operation log; and
   at the back-end node of the computing system:
   persisting the operation log received from the front-end node in the NVM;
   persisting the transaction log received from the front-end node in the NVM; and
   performing memory updates according to the plurality of the memory operation records to accomplish the data structure operation, with the data structure operation record in the operation log received by the back-end node serving as a commit signal for the transaction.

2. The method of claim 1, wherein at least one memory operation record of the plurality of memory operation records carries a flag that indicates the at least one memory operation record uses a value stored in the data structure operation record.

3. The method of claim 1, wherein the operation log at the front-end node includes a plurality of data structure operation records for a plurality of data structure operations and the transaction log at the front-end node includes a plurality of transaction records for a plurality of transactions corresponding to the plurality of data structure operations, wherein the method further comprises:
   at the front-node end:
   determining that a first data structure operation of the plurality of data structure operations is annulled by a second data structure operation in the plurality of data structure operations; and
   flushing the transaction log without sending to the back-end node transaction records for transactions corresponding to the first data structure operation and the second data structure operation.

4. The method of claim 1, wherein the operation log persisted in the NVM includes a plurality of data structure operation records for a plurality of data structure operations and the transaction log persisted in the NVM includes a plurality of transaction records for a plurality of transactions corresponding to the plurality of data structure operations, wherein the method further comprises:
   during a recovery process, at the back-end node:
   based on the operation log, determining that one or more memory operations of the plurality of memory operations have not been performed; and
   executing the one or more memory operations.

5. The method of claim 1, wherein the operation log persisted in the NVM includes a plurality of data structure operation records for a plurality of data structure operations, wherein the method further comprises:
   during a recovery process, at the back-end node:
   based on the operation log, determining that the transaction log persisted in the NVM is inconsistent because one or more memory operation records have not been received by the back-end node; and
   notifying the front-end node about the transaction log being inconsistent; and
   at the front-end node:
   re-executing any not-yet completed transactions to regenerate the one or more memory operation records.

6. The method of claim 1, wherein the transaction log at the front-end node contains a plurality of transaction records and the method further comprises: combining two or more transaction records to be sent in one Remote Direct Memory Access (RDMA) write operation.

7. The method of claim 1, further comprising replicating the data structure in the NVM, the transaction log persisted in the NVM and the operation log persisted in the NVM to a mirror node.

8. The method of claim 1, further comprising promoting a front-end reader node to become a front-end writer node during a recovery process by giving the front-end reader node any necessary metadata from a global naming space stored in the NVM.

9. A computing system, comprising:
a front-end node comprising: at least one central processing unit (CPU), a dynamic random-access memory (DRAM) and a first Remote Direct Memory Access (RDMA) enabled network interface card (RNIC); and
a back-end node comprising a second RNIC and a non-volatile memory (NVM),
wherein the at least one CPU at the front-end node is configured to:
generate a data structure operation record for a data structure operation, the data structure operation being directed to a data structure persisted in the NVM and at least partially cached in the DRAM, the data structure operation record including an operation type and parameter(s) for the data structure operation;
append the data structure operation record in an operation log;
generate a transaction record for a transaction, the transaction including a plurality of memory operations that collectively accomplishing the data structure operation on the data structure persisted in the NVM, the transaction record including a plurality of memory operation records corresponding to the plurality of memory operations;
append the transaction record in a transaction log;
flush the operation log to the back-end node via the first RNIC; and
flush the transaction log to the back-end node via the first RNIC after flushing the operation log;
wherein the second RNIC at the back-end node is configured to:
persist the operation log received from the front-end node in the NVM;
persist the transaction log received from the front-end node in the NVM; and
perform memory updates according to the plurality of the memory operation records to accomplish the data structure operation, with the data structure operation record in the operation log received by the back-end node serving as a commit signal for the transaction.

10. The computing system of claim 9, wherein at least one memory operation record of the plurality of memory operation records carries a flag that indicates the at least one memory operation record uses a value stored in the data structure operation record.

11. The computing system of claim 9, wherein the operation log at the front-end node includes a plurality of data structure operation records for a plurality of data structure operations and the transaction log at the front-end node includes a plurality of transaction records for a plurality of transactions corresponding to the plurality of data structure operations, wherein the CPU at the front-end node is further configured to:
determine that a first data structure operation of the plurality of data structure operations is annulled by a second data structure operation in the plurality of data structure operations; and
flush the transaction log without sending to the back-end node transaction records for transactions corresponding to the first data structure operation and the second data structure operation.

12. The computing system of claim 9, wherein the operation log persisted in the NVM includes a plurality of data structure operation records for a plurality of data structure operations and the transaction log persisted in the NVM includes a plurality of transaction records for a plurality of transactions corresponding to the plurality of data structure operations, wherein the back-end node further comprising circuitry configured to:
based on the operation log, determine that one or more memory operations of the plurality of memory operations have not been performed; and
execute the one or more memory operations.

13. The computing system of claim 9, wherein the operation log persisted in the NVM includes a plurality of data structure operation records for a plurality of data structure operations, wherein during a recovery process the back-end node further comprises circuitry configured to:
based on the operation log, determine that the transaction log persisted in the NVM is inconsistent because one or more memory operation records have not been received by the back-end node; and
notify the front-end node about the transaction log being inconsistent; and
wherein the CPU at the front-end node is further configure to:
re-execute any not-yet completed transactions to regenerate the one or more memory operation records.

14. The computing system of claim 9, wherein the transaction log at the front-end node contains a plurality of transaction records and the CPU at the front-end node is further configured to: combine two or more transaction records to be sent in one Remote Direct Memory Access (RDMA) write operation.

15. The computing system of claim 9, further comprising a mirror node for the back-end node and the back-end node further comprising circuitry configured to replicate the data structure in the NVM, the transaction log persisted in the NVM and the operation log persisted in the NVM to the mirror node.

16. One or more computer-readable non-transitory media comprising one or more instructions that when executed by one or more processors is to configure the one or more processors to cause performance of operations comprising:
at a front-end node in a computing system:
generating a data structure operation record for a data structure operation, the data structure operation being directed to a data structure persisted in a non-volatile memory (NVM) in a back-end node of the computing system, the data structure operation record including an operation type and parameter(s) for the data structure operation;
appending the data structure operation record in an operation log;
generating a transaction record for a transaction, the transaction including a plurality of memory operations that collectively accomplishing the data structure operation on the data structure persisted in the NVM, the transaction record including a plurality of memory operation records corresponding to the plurality of memory operations;
appending the transaction record in a transaction log;
flushing the operation log to the back-end node; and
flushing the transaction log to the back-end node after flushing the operation log; and
at the back-end node of the computing system:
persisting the operation log received from the front-end node in the NVM;
persisting the transaction log received from the front-end node in the NVM; and
performing memory updates according to the plurality of the memory operation records to accomplish the data structure operation, with the data structure operation record in the operation log received by the back-end node serving as a commit signal for the transaction.

17. The computer-readable non-transitory media of claim 16, wherein at least one memory operation record of the plurality of memory operation records carries a flag that indicates the at least one memory operation record uses a value stored in the data structure operation record.

18. The computer-readable non-transitory media of claim 16, wherein the operation log at the front-end node includes a plurality of data structure operation records for a plurality of data structure operations and the transaction log at the front-end node includes a plurality of transaction records for a plurality of transactions corresponding to the plurality of data structure operations, wherein the one or more processors are further caused to perform operations comprising:
   at the front-node end:
      determining that a first data structure operation of the plurality of data structure operations is annulled by a second data structure operation in the plurality of data structure operations; and
      flushing the transaction log without sending to the back-end node transaction records for transactions corresponding to the first data structure operation and the second data structure operation.

19. The computer-readable non-transitory media of claim 16, wherein the operation log persisted in the NVM includes a plurality of data structure operation records for a plurality of data structure operations and the transaction log persisted in the NVM includes a plurality of transaction records for a plurality of transactions corresponding to the plurality of data structure operations, wherein the one or more processors are further caused to perform operations comprising:
   during a recovery process, at the back-end node:
      based on the operation log, determining that one or more memory operations of the plurality of memory operations have not been performed; and
      executing the one or more memory operations.

20. The computer-readable non-transitory media of claim 16, wherein the operation log persisted in the NVM includes a plurality of data structure operation records for a plurality of data structure operations, wherein the one or more processors are further caused to perform operations comprising:
   during a recovery process, at the back-end node:
      based on the operation log, determining that the transaction log persisted in the NVM is inconsistent because one or more memory operation records have not been received by the back-end node; and
      notifying the front-end node about the transaction log being inconsistent; and
   at the front-end node:
      re-executing any not-yet completed transactions to regenerate the one or more memory operation records.

* * * * *